(12) United States Patent
Williams et al.

(10) Patent No.: US 10,189,381 B2
(45) Date of Patent: Jan. 29, 2019

(54) SAFETY BELT ASSEMBLING DEVICE CAPABLE OF ASSEMBLING A CHILD RESTRAINT SYSTEM WITH A VEHICLE SEAT

(71) Applicant: Wonderland Switzerland AG, Steinhausen (CH)

(72) Inventors: Bruce Williams, Narvon, PA (US); Gregory Sellers, Christiana, PA (US); David Andrew Lehman, Lancaster, PA (US); Kyle Mason, West Lawn, PA (US); R. Scott Anderson, Narvon, PA (US); Curtis Hartenstine, Birdsboro, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/697,456

(22) Filed: Sep. 7, 2017

(65) Prior Publication Data
US 2018/0079330 A1 Mar. 22, 2018

Related U.S. Application Data

(60) Provisional application No. 62/395,706, filed on Sep. 16, 2016, provisional application No. 62/420,964, filed on Nov. 11, 2016.

(51) Int. Cl.
*B60N 2/26* (2006.01)
*B60N 2/28* (2006.01)
*B60R 22/02* (2006.01)

(52) U.S. Cl.
CPC ........... *B60N 2/2806* (2013.01); *B60N 2/265* (2013.01); *B60R 2022/025* (2013.01)

(58) Field of Classification Search
CPC .. B60N 2/265; B60N 2/2806; B60R 2022/025
(Continued)

(56) References Cited

U.S. PATENT DOCUMENTS 5,186,520 A * 2/1993 Whitaker ............. B60N 2/2803
24/136 R
6,152,528 A * 11/2000 van Montfort ........ A44B 11/08
297/250.1

(Continued)

FOREIGN PATENT DOCUMENTS

AU         527654      3/1983
DE       25 22 285 A1  12/1975
(Continued)

*Primary Examiner* — Rodney B White
(74) *Attorney, Agent, or Firm* — Winston Hsu

(57) ABSTRACT

A safety belt assembling device is designed to assemble a child restraint system with a vehicle seat. The safety belt assembling device includes a child restraint having a sunken structure, a panel and a fastener mechanism. The child restraint is connected with the child restraint system. The panel is rotatably disposed on the child restraint and adapted to press a safety belt of the vehicle seat inside the sunken structure. The fastener mechanism includes a locking rod, at least one latching hook and a releasing actuator. The locking rod is disposed inside the sunken structure. The latching hook is rotatably disposed on the panel and utilized to detachably catch on the locking rod. The releasing actuator is rotatably disposed on the panel and connected with the latching hook. The releasing actuator is rotated from a flush position to a protruding position to disengage the latching hook from the locking rod.

19 Claims, 16 Drawing Sheets

(58) Field of Classification Search
USPC .................................................. 297/256.16
See application file for complete search history.

(56) References Cited

U.S. PATENT DOCUMENTS

| | | | |
|---|---|---|---|
| 6,474,735 B1 | 11/2002 | Carnahan | |
| 6,508,510 B2 * | 1/2003 | Yamazaki | B60N 2/2806 297/250.1 |
| 6,672,664 B2 * | 1/2004 | Yanaka | B60N 2/2806 297/256.16 X |
| 6,857,700 B2 | 2/2005 | Eastman | |
| 7,163,265 B2 * | 1/2007 | Adachi | B60N 2/2806 297/256.16 X |
| 7,472,955 B2 * | 1/2009 | Crane | B60N 2/2806 297/256.16 X |
| 7,926,874 B2 * | 4/2011 | Hendry | B60N 2/2806 297/256.16 X |
| 7,988,230 B2 * | 8/2011 | Heisey | B60N 2/2821 297/256.16 X |
| 8,177,303 B2 | 5/2012 | Chen | |
| 8,262,161 B2 * | 9/2012 | Fritz | B60N 2/2806 297/256.16 X |
| 8,322,788 B2 * | 12/2012 | Williams | B60N 2/2806 297/256.16 |
| 8,567,862 B2 * | 10/2013 | Williams | B60N 2/2806 297/256.16 X |
| 8,573,695 B2 * | 11/2013 | Van Geer | B60N 2/2806 297/256.16 |
| 8,845,022 B2 * | 9/2014 | Strong | B60N 2/2824 297/256.16 |
| 8,870,285 B2 * | 10/2014 | Williams | B60N 2/2821 297/256.16 X |
| 8,973,991 B2 * | 3/2015 | Wuerstl | B60N 2/2806 297/253 |
| 8,973,992 B2 * | 3/2015 | Guo | B60N 2/2806 297/256.1 X |
| 9,156,379 B2 * | 10/2015 | Williams | B60N 2/2821 |
| 9,174,554 B2 * | 11/2015 | Maciejczyk | B60N 2/265 |
| 9,308,838 B2 * | 4/2016 | Miller | B60N 2/2821 |
| 9,315,124 B2 * | 4/2016 | Lehman | B60N 2/2806 |
| 9,365,135 B2 * | 6/2016 | Carpenter | B60N 2/2821 |
| 9,499,074 B2 * | 11/2016 | Strong | B60N 2/2806 |
| 9,937,823 B2 * | 4/2018 | Williams | B60N 2/2812 |
| 9,963,051 B2 * | 5/2018 | Strong | B60N 2/2806 |
| 10,023,079 B2 * | 7/2018 | Zhao | B60N 2/2806 |
| 10,035,436 B2 * | 7/2018 | Zhou | B60N 2/2806 |
| 2002/0113470 A1 | 8/2002 | Kain | |
| 2003/0151286 A1 | 8/2003 | Kain | |
| 2003/0164632 A1 | 9/2003 | Sedlack | |
| 2004/0070244 A1 | 4/2004 | Williams | |
| 2005/0110318 A1 | 5/2005 | Meeker | |
| 2009/0127902 A1 | 5/2009 | Meeker | |
| 2011/0057489 A1 | 3/2011 | Greene | |
| 2014/0265489 A1 * | 9/2014 | Morgenstern | B60N 2/2812 297/256.15 |
| 2016/0311345 A1 * | 10/2016 | Morgenstern | B60N 2/2806 |
| 2016/0347210 A1 * | 12/2016 | Mason | B60N 2/2806 |
| 2016/0347212 A1 * | 12/2016 | Mason | B60N 2/2821 |
| 2017/0355287 A1 * | 12/2017 | Anderson | B60N 2/2806 |
| 2018/0056822 A1 * | 3/2018 | Anderson | B60N 2/2806 |

FOREIGN PATENT DOCUMENTS

| | | |
|---|---|---|
| DE | 42 04 232 A1 | 9/1992 |
| DE | 10 2005 025 570 A1 | 12/2006 |
| DE | 10 2009 017 601 A1 | 10/2010 |
| EP | 1 393 967 A1 | 3/2004 |

* cited by examiner

SAFETY BELT ASSEMBLING DEVICE CAPABLE OF ASSEMBLING A CHILD RESTRAINT SYSTEM WITH A VEHICLE SEAT

CROSS REFERENCE TO RELATED APPLICATIONS

This application claims the benefit of U.S. provisional application No. 62/420,964 (which was filed on 2016 Nov. 11), and U.S. provisional application No. 62/395,706 (which was filed on 2016 Sep. 16). The entire contents of these related applications are incorporated herein by reference.

BACKGROUND OF THE INVENTION

1. Field of the Invention

The present invention relates to a safety belt assembling device, and more particularly, to a safety belt assembling device capable of assembling a child restraint system with a vehicle seat in the convenient way.

2. Description of the Prior Art

Conventional passenger vehicles have safety belts that can be used to restrain adult passengers or child restraint systems that further restrain and protect infants and children. To ensure safety of all vehicle passengers, it is important that child restraints can be assembled to the vehicle seat in a convenient, snug, and secure manner. Using current installation methods, it can be difficult to achieve a snug and secure installation of a child restraint with a vehicle belt. Therefore, the design of an assembling device capable of snug and secure installation of child restraint systems to vehicle seats is an important issue in the related industry.

SUMMARY OF THE INVENTION

The present invention provides a safety belt assembling device capable of assembling a child restraint system with a vehicle seat in the convenient way for solving the above drawbacks.

According to the claimed invention, a safety belt assembling device is designed to assemble a child restraint system with a vehicle seat. In a possible purpose, the safety belt assembling device is disposed on the vehicle seat by the safety belt, and the child restraint system can be detachably assembled with the safety belt assembling device to stand on the vehicle seat. In another possible purpose, the safety belt assembling device is integrated with the back of the child restraint, a safety belt of the vehicle seat passes through the hole on the child restraint system and is fastened by the safety belt assembling device, so as to stably constrain the child restraint system on the vehicle seat. The safety belt assembling device utilizes a panel to press the safety belt with a child restraint, the safety belt is sunk into a sunken structure of the child restraint, and engagement of the panel and the sunken structure is fixed by a fastener mechanism, so that the safety belt assembling device and the related child restraint can be fastened on the vehicle seat. The fastener mechanism utilizes a latching hook and a locking rod to prevent the panel from being rotated relative to the child restraint, and further utilizes a releasing actuator to manually control motion of the latching hook. The latching hook optionally has two-stage operation and automatic recovering function, and minimal effort is required to conveniently install the child restraint system each time.

The safety belt assembling device is connected with the child restraint system, and includes the child restraint having the sunken structure, the panel and the fastener mechanism. The panel is rotatably disposed on the child restraint and is adapted to press the safety belt of the vehicle seat inside the sunken structure. The fastener mechanism includes the locking rod, at least one or more latching hooks and the releasing actuator. The locking rod is disposed inside the sunken structure. The latching hook is rotatably disposed on the panel and utilized to detachably catch on the locking rod. The releasing actuator is rotatably disposed on the panel and connected with the latching hook. The releasing actuator is rotated from a flush position to a protruding position to disengage the latching hook from the locking rod. The fastener mechanism further includes a first recovering component disposed between the latching hook and the panel, and utilized to engage the latching hook with the locking rod. The fastener mechanism further includes a second recovering component disposed between the releasing actuator and the panel, and utilized to press the releasing actuator from the protruding position to the flush position.

According to the claimed invention, the latching hook includes a pivot portion pivotally connected with the panel, a first contact portion connected with the pivot portion, and a hook portion connected with the pivot portion and opposite to the first contact portion. The hook portion is engaged with and disengaged from the locking rod in accordance with motion of the first contact portion. The releasing actuator includes a handle portion and a second contact portion connected with each other, the second contact portion contacts against the first contact portion, and motion of the first contact portion and the second contact portion are actuated by pull of the handle portion. The panel includes a concave structure whereinside the latching hook and the releasing actuator are disposed, and the handle portion align with an edge of the concave structure while the releasing actuator is located at the flush position. A dimension of the concave structure is greater than a dimension of the handle portion. The fastener mechanism further includes a resilient component disposed between the latching hook and the panel. The resilient component moves the latching hook to engage with the locking rod and simultaneously drives rotation of the releasing actuator. The latching hook includes a pivot portion pivotally connected with the panel, and a hook portion connected with the pivot portion and engaged with the locking rod in a detachable manner.

In a second embodiment, the releasing actuator may include a first handle portion and a second handle portion rotatably connected with each other, and an edge of the first handle portion detachably contacts against the second handle portion. The panel includes a concave structure whereinside the latching hook and the releasing actuator are disposed, the second handle portion is pushed into the concave structure to move the first handle portion from a first stage to a second stage to be exposed out of the concave structure, and the latching hook is still engaged with the locking rod. The first handle portion and the second handle portion align with edges of the concave structure while the releasing actuator is set at the flush position. When the second handle portion is static, the first handle portion is pulled outward from the second stage to a third stage to contact and disengage the latching hook from the locking rod. The latching hook is synchronously rotated with rotation of the first handle portion while the first handle portion is moved from the second stage to the third stage.

In a third embodiment, the releasing actuator may include a handle portion with a pull end and a push end opposite to each other, and a middle of the handle portion is rotatably disposed on the panel. The panel includes a concave structure whereinside the latching hook and the releasing actuator are disposed, the push end is pressed into the concave structure to move the pull end out of the concave structure. The releasing actuator further includes a contacting portion connected to the handle portion and abutting against the pivot portion, the latching hook is synchronously rotated with rotation of the releasing actuator via the contacting portion. The latching hook further includes a bridge portion located between the pivot portion and the hook portion, the releasing actuator presses the bridge portion to rotate and engage the latching hook with the locking rod.

According to the claimed invention, when the safety belt assembling device is disposed on the vehicle seat, the safety belt assembling device may also include a chassis rotatably disposed under the bottom of the child restraint, and a reclined adjusting mechanism disposed between the child restraint and the chassis and adapted to adjust a lift height of the child restraint bottom relative to the chassis. The reclined adjusting mechanism includes a handlebar movably disposed on the child restraint, a rack unit disposed inside the chassis and having a plurality of slot structures, and a joining component rotatably disposed on the child restraint. A first end of the joining component is connected to the handlebar via a linking member, and a second end of the joining component different from the first end is detachably engaged with one of the plurality of slot structures. The reclined adjusting mechanism further includes an elastic component disposed between the child restraint and the first end of the joining component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
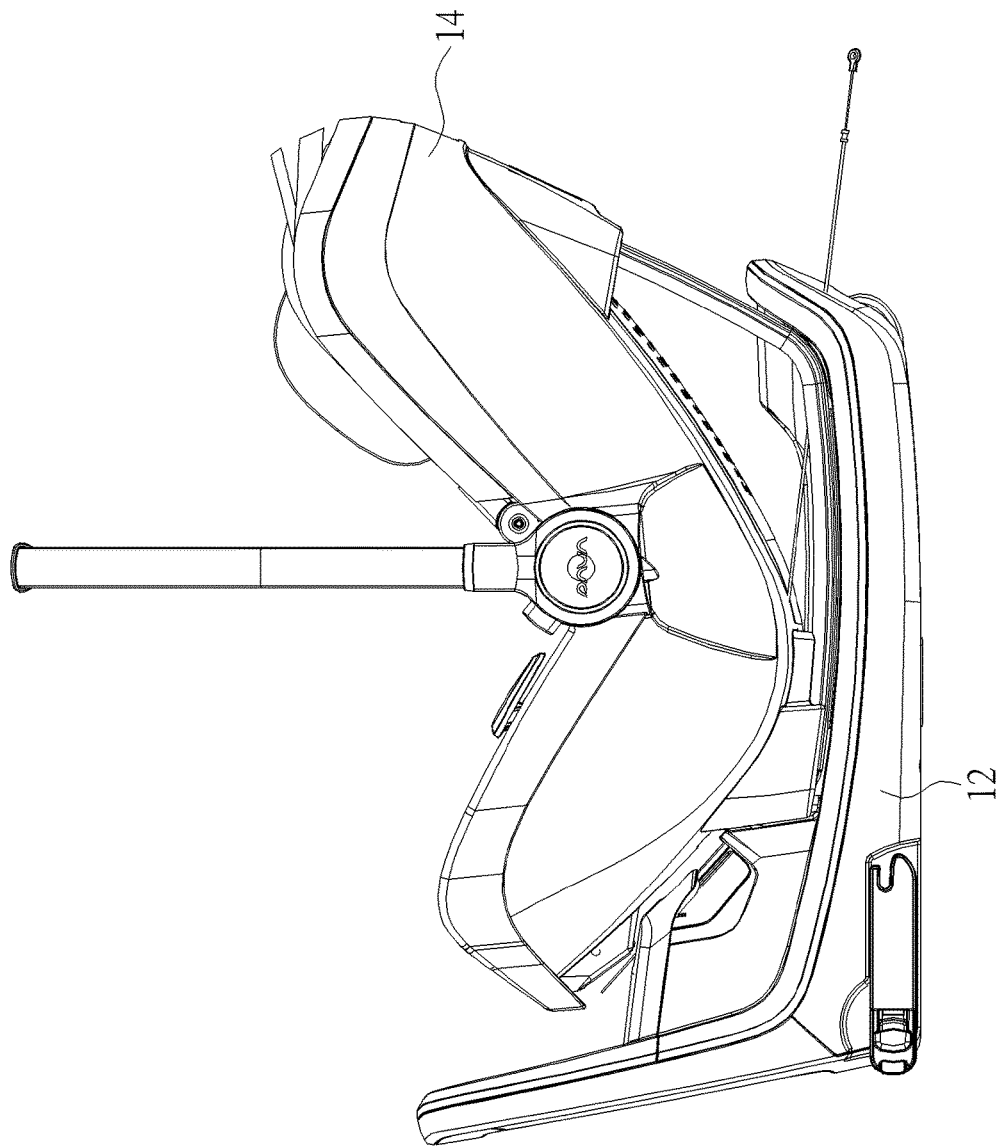
FIG. 1 is a diagram of a safety belt assembling device and a child restraint system according to an embodiment of the present invention.
Figure 2:
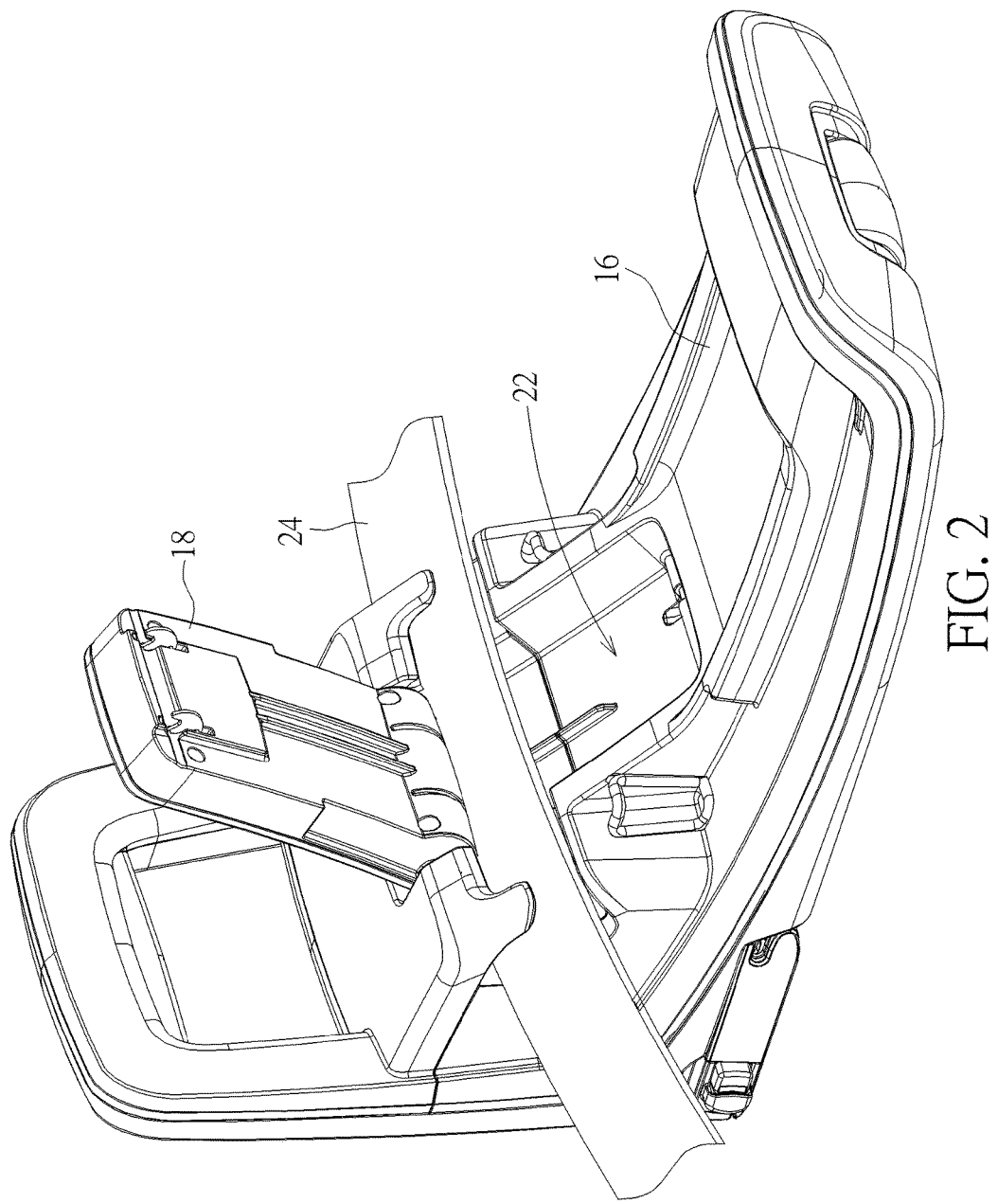
FIG. 2 is a diagram of a safety belt assembling device according to a first embodiment of the present invention.
Figure 3:
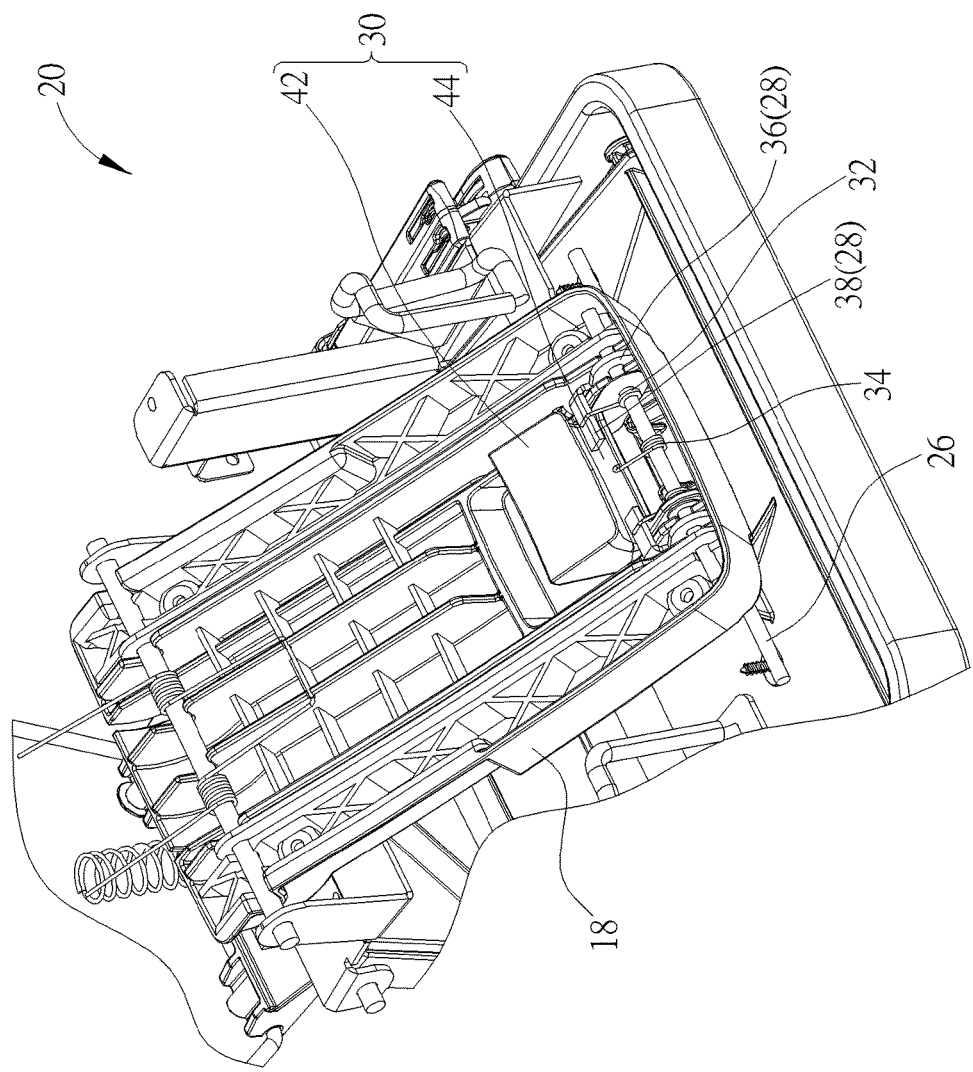
FIG. 3 is another view of the safety belt assembling device according to the first embodiment of the present invention.
Figure 4:
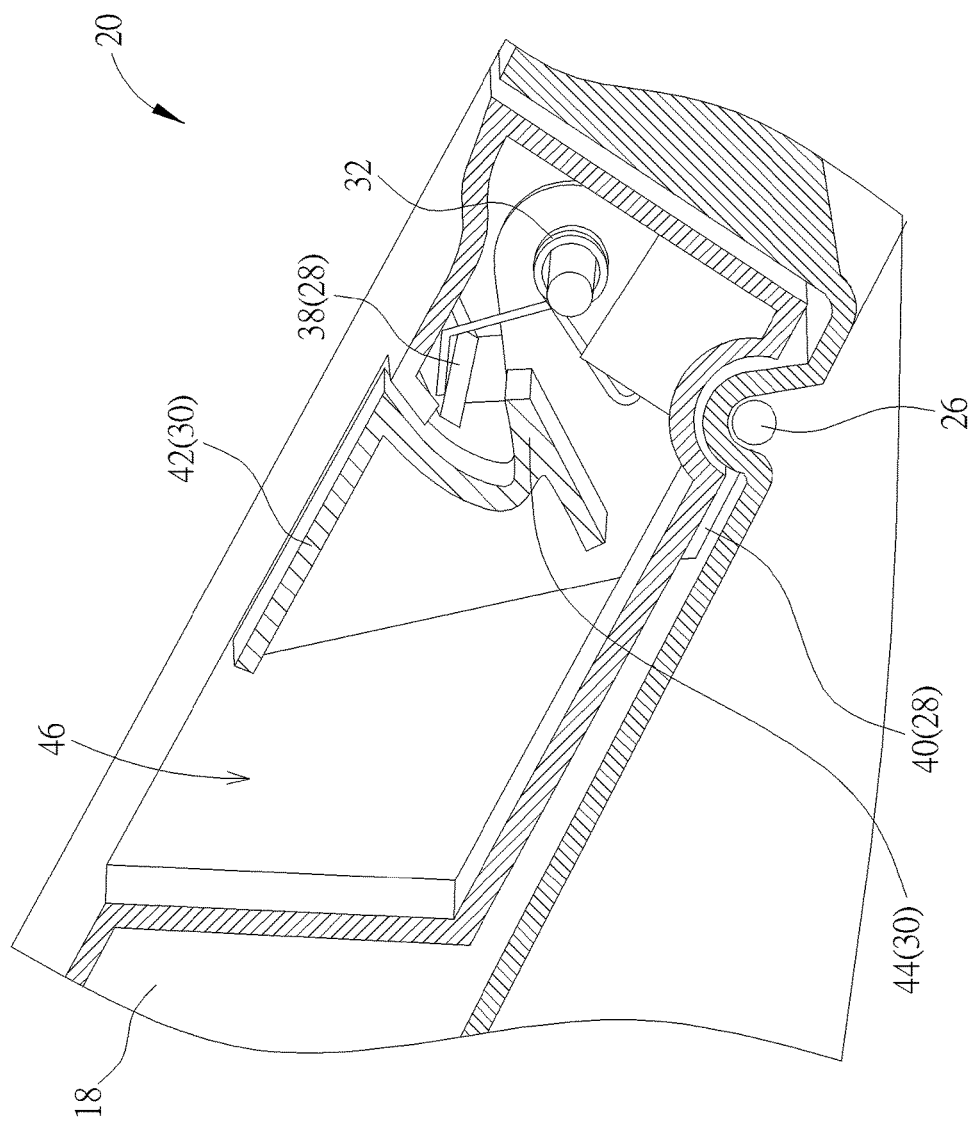
FIG. 4 and FIG. 5 respectively are diagrams of the safety belt assembling device in different operational modes according to the first embodiment of the present invention.
Figure 5:
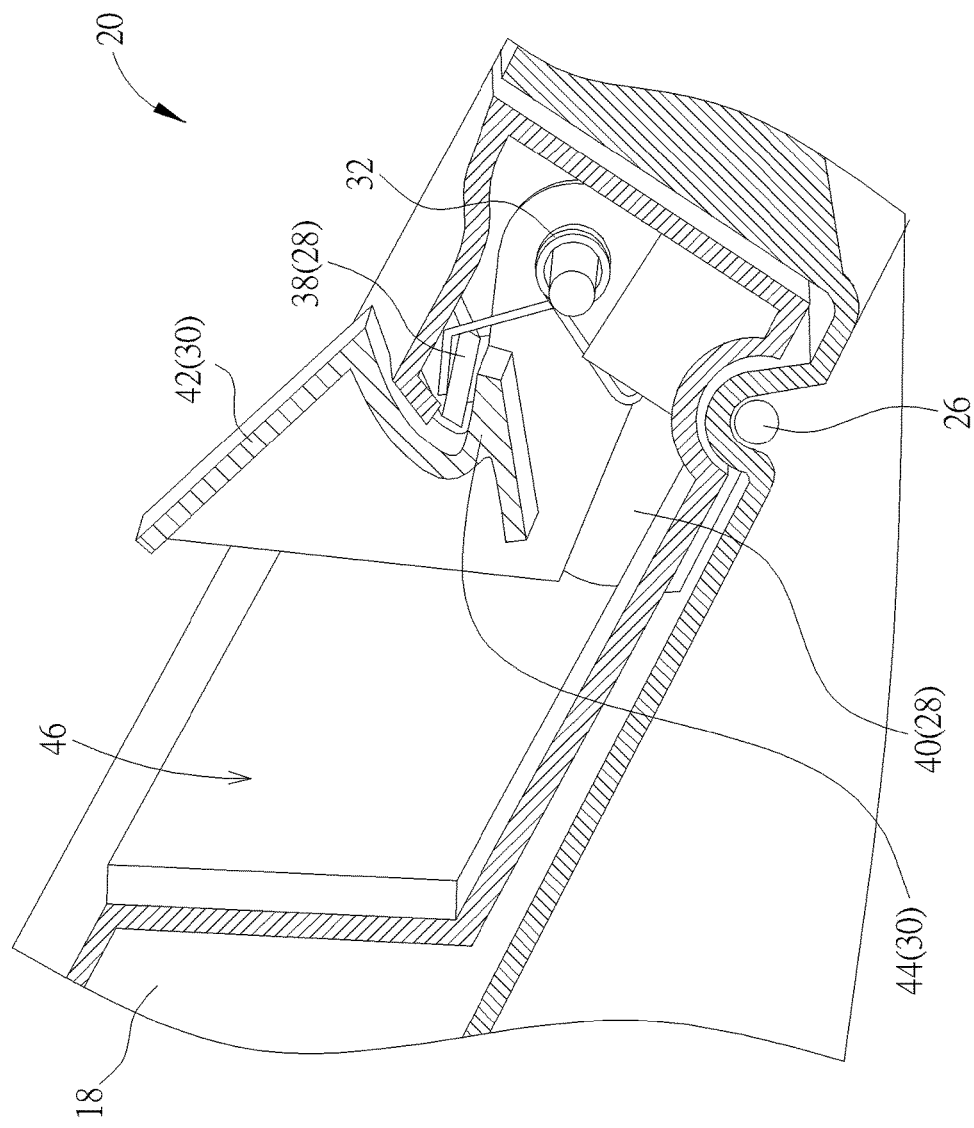

Please refer to FIG. 1 to FIG. 5. FIG. 1 is a diagram of a safety belt assembling device 12 and a child restraint system 14 according to an embodiment of the present invention. FIG. 2 is a diagram of a safety belt assembling device 12 according to a first embodiment of the present invention. FIG. 3 is another view of the safety belt assembling device 12 according to the first embodiment of the present invention. FIG. 4 and FIG. 5 respectively are diagrams of the safety belt assembling device 12 in different operational modes according to the first embodiment of the present invention. In the first embodiment, the safety belt assembling device 12 can be separated from the child restraint system 14, and is utilized to assemble the child restraint system 14 with a vehicle seat (not shown in the figures). For example, the safety belt assembling device 12 can be disposed on the vehicle seat by its safety belt 24, and the child restraint system 14 can be detachably engaged with the safety belt assembling device 12 to stay above the vehicle seat.

The safety belt assembling device 12 can include a child restraint 16, a panel 18 and a fastener mechanism 20. The child restraint 16 is connected with the child restraint system 14 and has a sunken structure 22 to accommodate a safety belt 24 of the vehicle seat. The panel 18 is rotatably disposed on the child restraint 16 and adapted to press and fix the safety belt 24 inside the sunken structure 22. The fastener mechanism 20 can include a locking rod 26, a latching hook 28, a releasing actuator 30, a first recovering component 32 and a second recovering component 34. The locking rod 26 is disposed inside the sunken structure 22, and the latching hook 28 and the releasing actuator 30 are rotatably disposed on the panel 18 and connected with each other. The fastener mechanism 20 may have one or a plurality of latching hooks 28, which depends on design demand. The releasing actuator 30 can be manually manipulated to rotate the latching hook 28, and the latching hook 28 can be engaged with and disengaged from the locking rod 26 accordingly.

The latching hook 28 can include a pivot portion 36, a first contact portion 38 and a hook portion 40. The pivot portion 36 is pivotally connected with the panel 18, and the first contact portion 38 and the hook portion 40 are connected with the pivot portion 36 and opposite to each other. As the first contact portion 38 is moved, the hook portion 40 can be engaged with and disengaged from the locking rod 26, which means the latching hook 28 can detachably catch on the locking rod 26. The releasing actuator 30 can include a handle portion 42 and a second contact portion 44 connected with each other. The second contact portion 44 can contact the first contact portion 38, and the first contact portion 38 and the second contact portion 44 can be lifted up while the handle portion 42 is pulled up manually from a flush position (which can be represented as the state shown in FIG. 4) to a protruding position (which can be represented as the state shown in FIG. 5).

The latching hook 28 and the releasing actuator 30 can be disposed inside a concave structure 46 of the panel 18, and a dimension of the concave structure 46 can be greater than a dimension of the handle portion 42, so that the handle portion 42 is easily manipulated in manual; for example, the user may put fingers into the concave structure 46 to touch a bottom of the releasing actuator 30 for pushing upward. The first recovering component 32 can be disposed between the latching hook 28 and the panel 18, and a resilient recovering force of the first recovering component 32 drives the latching hook 28 to engage with the locking rod 26. The second recovering component 34 can be disposed between the releasing actuator 30 and the panel 18, and a resilient recovering force of the second recovering component 34 moves the releasing actuator 30 from the protruding position to the flush position.

As shown in FIG. 4, the releasing actuator 30 is located at the flush position, the handle portion 42 of the releasing actuator 30 aligns with an edge of the concave structure 46, and the first recovering component 32 presses the latching hook 28 to engage with the locking rod 26 and be located at a locked position; it should be mentioned that the latching hook 28 can function separately and independently from the releasing actuator 30, so the releasing actuator 30 can remain in a closed position for ease of closing the panel 18. As shown in FIG. 5, the releasing actuator 30 is pulled up and moved from the flush position to the protruding position, the latching hook 28 is rotated from the locked position to an unlocked position by contact of the first contact portion 38 and the second contact portion 44, and the panel 18 can be opened for routing the safety belt 24 (which can be shown in FIG. 2) across a belt path on the child restraint 16.

As the safety belt 24 is tied on, an external force applied to the handle portion 42 is removed, the first recovering component 32 can return the latching hook 28 from the unlocked position to the locked position for engaging with the locking rod 26, the second recovering component 34 can return the releasing actuator 30 from the protruding position to the flush position, and the panel 18 is moved back into the sunken structure 22, therefore the latching hook 28 can ramp into the locked position without motion of the releasing actuator 30. Moreover, the latching hook 28 may be designed as the first contact portion 38 can contact the second contact portion 44 while the latching hook 28 is returned, so that the latching hook 28 which is moved from the unlocked position to the locked position can contact and move the releasing actuator 30 from the protruding position to the flush position.

Figure 6:
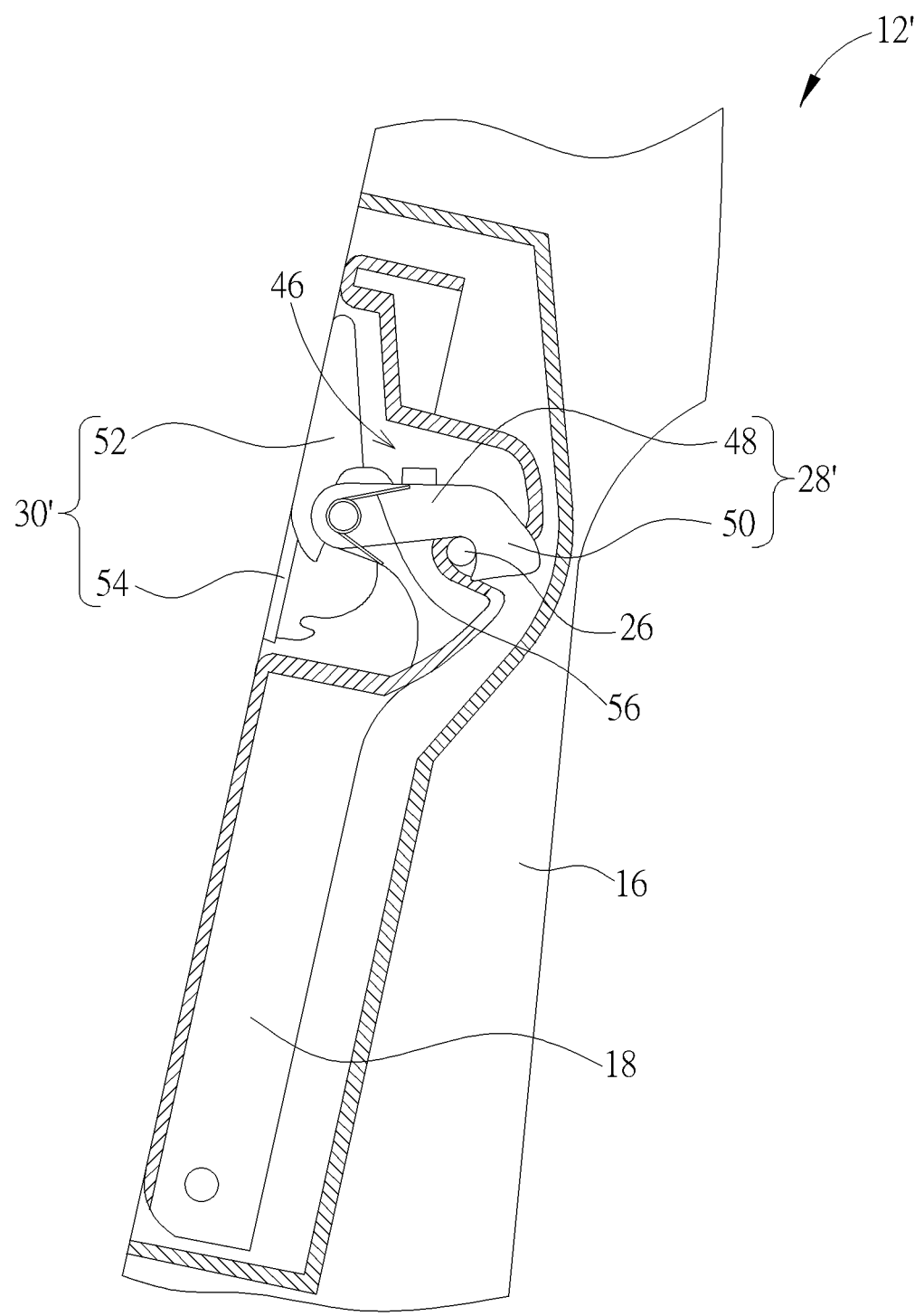
FIG. 6 to FIG. 8 respectively are diagrams of the safety belt assembling device in different operational modes according to a second embodiment of the present invention.
Figure 7:
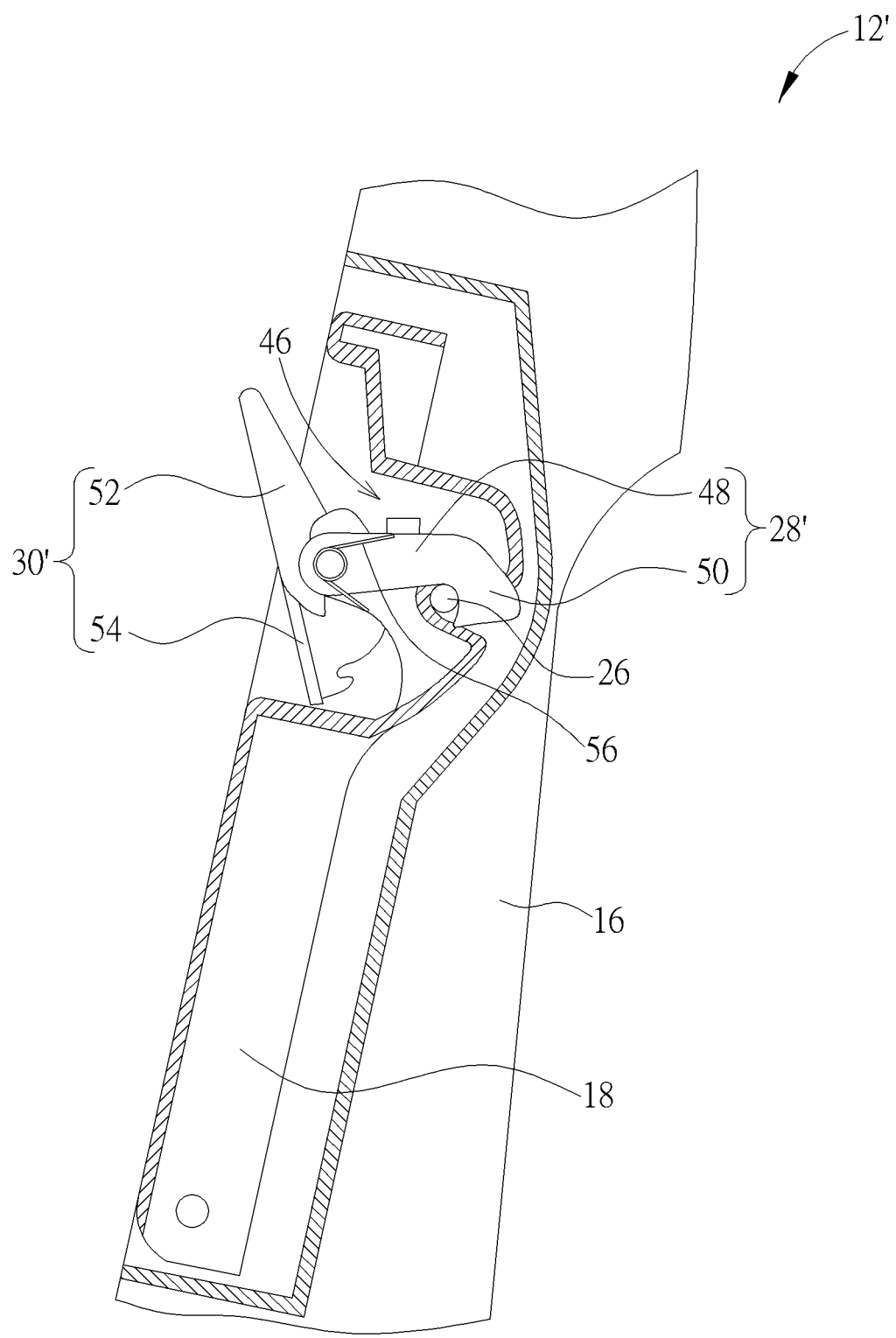
Figure 8:
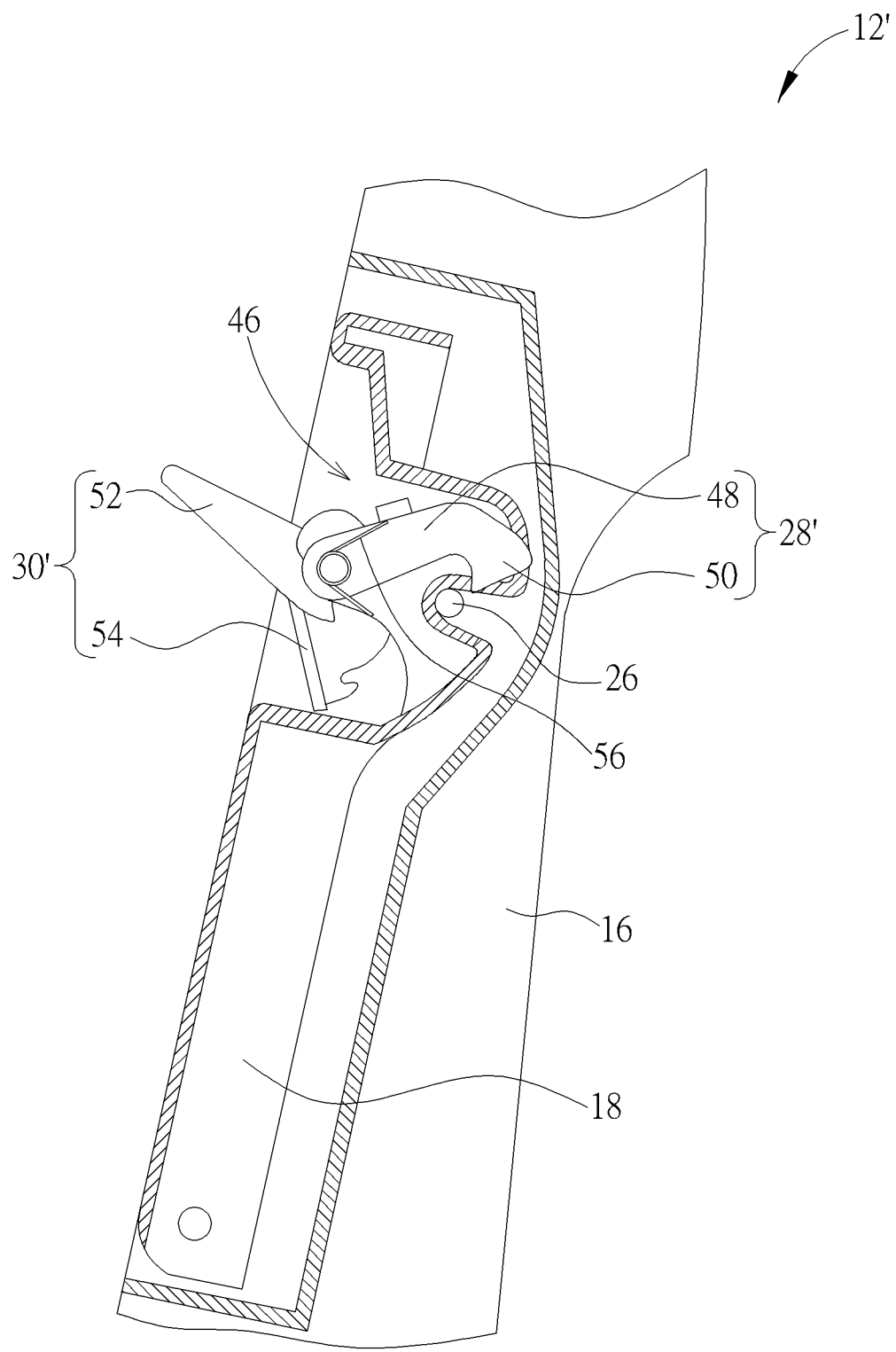

Please refer to FIG. 6, FIG. 7 and FIG. 8. FIG. 6 to FIG. 8 respectively are diagrams of the safety belt assembling device 12' in different operational modes according to a second embodiment of the present invention. In the second embodiment, elements having the same numerals as ones of the first embodiment have the same structures and functions, and a detailed description is omitted for simplicity. The latching hook 28' of the safety belt assembling device 12' can include a pivot portion 48 and a hook portion 50 connected with each other. The pivot portion 48 is pivotally connected with the panel 18, and the hook portion 50 can be engaged with the locking rod 26 in a detachable manner. The releasing actuator 30' of the safety belt assembling device 12' can include a first handle portion 52 and a second handle portion 54 rotatably connected with each other. An edge of the first handle portion 52 detachably contacts against the second handle portion 54, and the other edge of the first handle portion 52 can be pulled in manual.

As shown in FIG. 6, the first handle portion 52 is set as a first stage, the first handle portion 52 and the second handle portion 54 align with edges of the concave structure 46 while the releasing actuator 30' is set at the flush position. Then, as shown in FIG. 7, the second handle portion 54 can be pushed into the concave structure 46 for a first, the first handle portion 52 can be rotated simultaneously to be exposed out of the concave structure 46 and be switched from the first stage to a second stage for being easily gripped and manipulated, and at this time, the hook portion 50 is still engaged with the locking rod 26. Final, as shown in FIG. 8, the first handle portion 52 can be pulled outward from the second stage to a third stage when the second handle portion 54 is static, the latching hook 28' is contacted and synchronously rotated with rotation of the first handle portion 52, and the hook portion 50 can be disengaged from the locking rod 26.

In the second embodiment, the safety belt assembling device 12' may have a resilient component 56 disposed between the latching hook 28' and the panel 18, the resilient component 56 can be utilized to move the latching hook 28' to engage with the locking rod 26 while the external force applied to the releasing actuator 30' is removed, and further to simultaneously rotate the releasing actuator 30' from the third stage back to the second stage (or may be back to the first stage in accordance with design demand). While the releasing actuator 30' is returned to the second stage, the first handle portion 52 can be pushed and further moved from the second stage to the first stage, and the second handle portion 54 can be returned to align with the edge of the concave structure 46. Besides, the resilient component 56 may be disposed between the releasing actuator 30' and the panel 18 (not shown in figures), to rotate the releasing actuator 30' from the third stage back to the second stage while the external force applied to the releasing actuator 30' is removed, and rotation of the releasing actuator 30' can move the latching hook 28' to engage with the locking rod 26.

Figure 9:
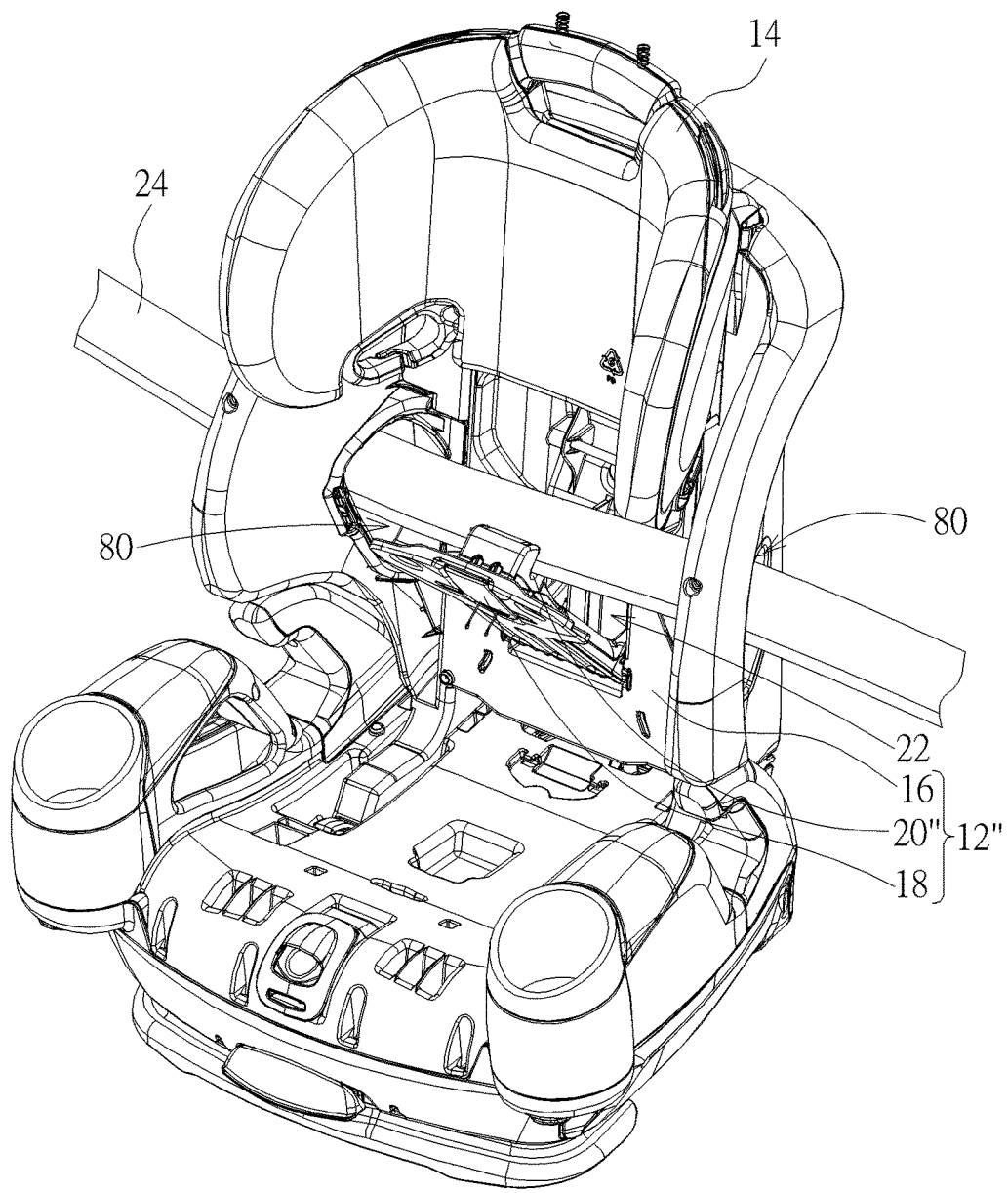
FIG. 9 is another diagram of the child restraint system according to the embodiment of the present invention.
Figure 10:
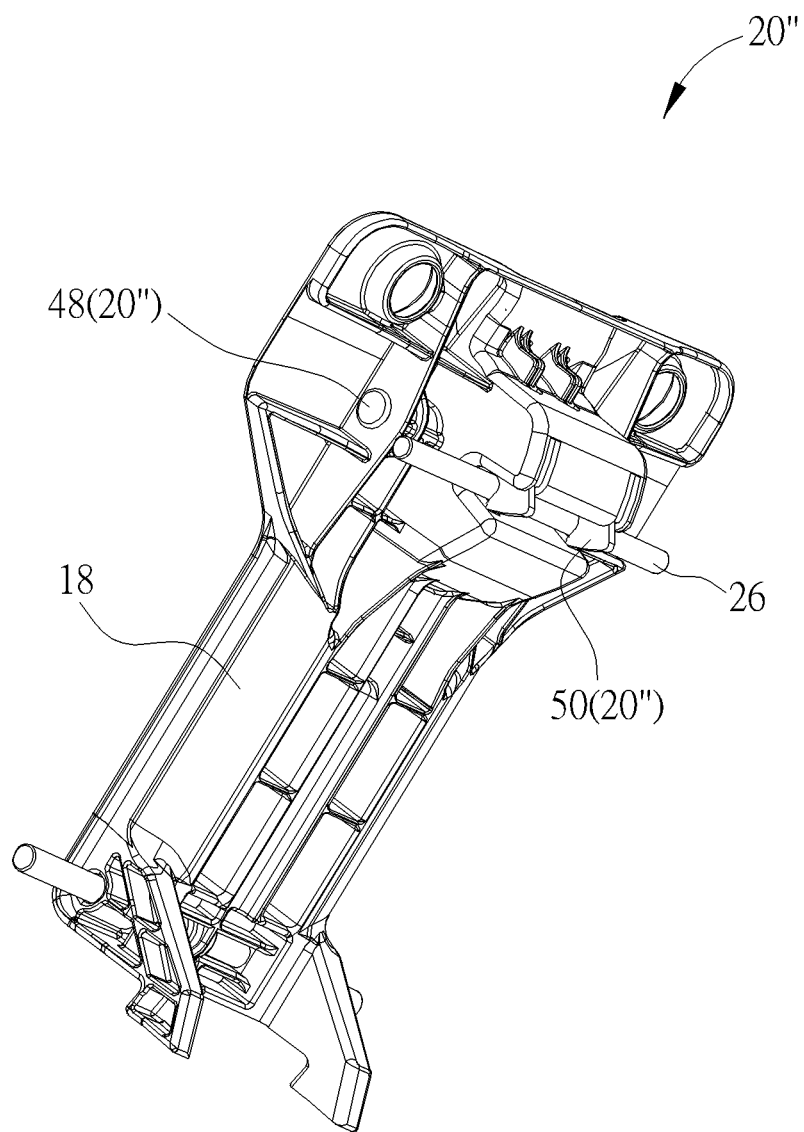
FIG. 10 is a diagram of the fastener mechanism of the safety belt assembling device according to a third embodiment of the present invention.
Figure 11:
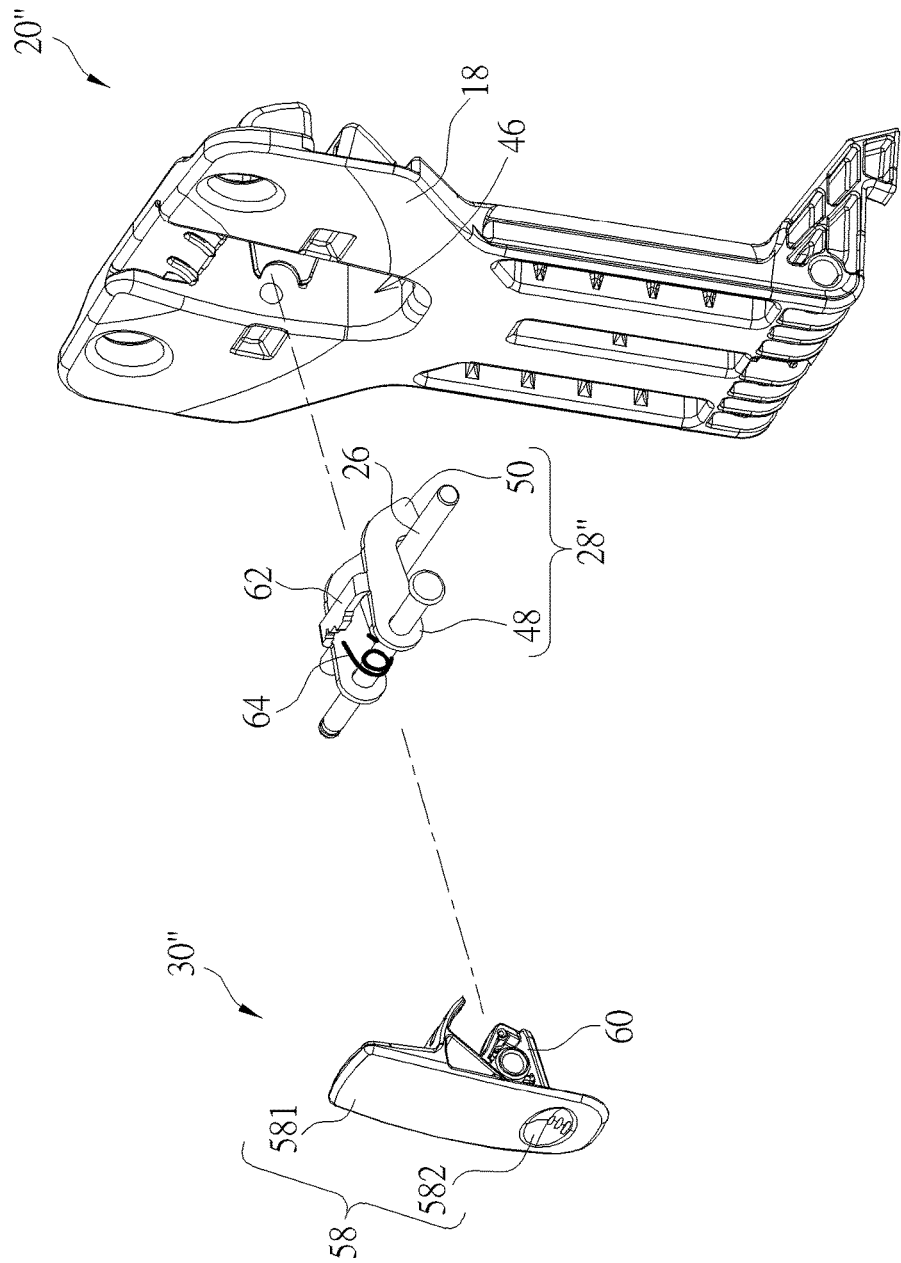
FIG. 11 and FIG. 12 respectively are exploded diagrams of the fastener mechanism in different views according to the third embodiment of the present invention.
Figure 12:
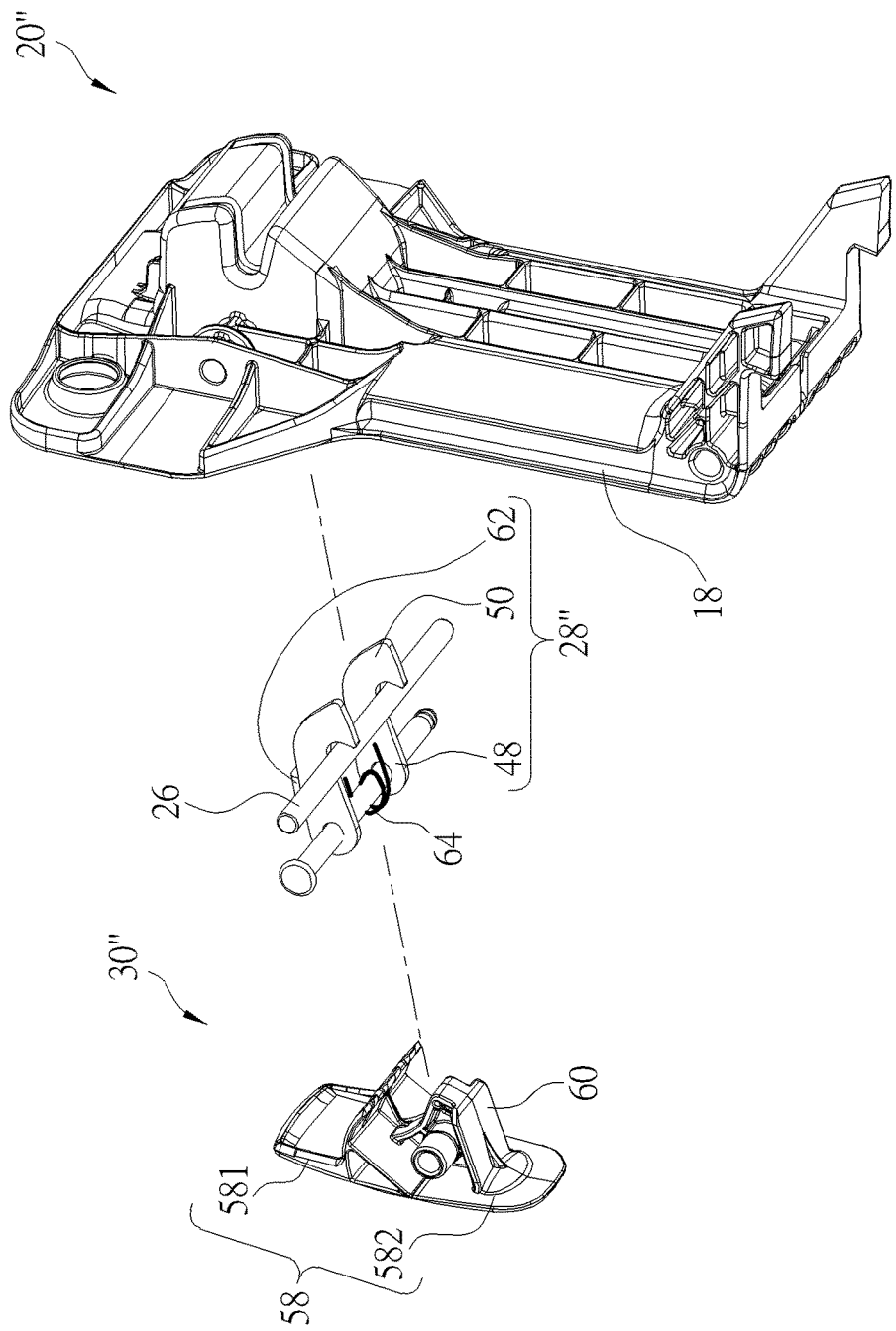
Figure 13:
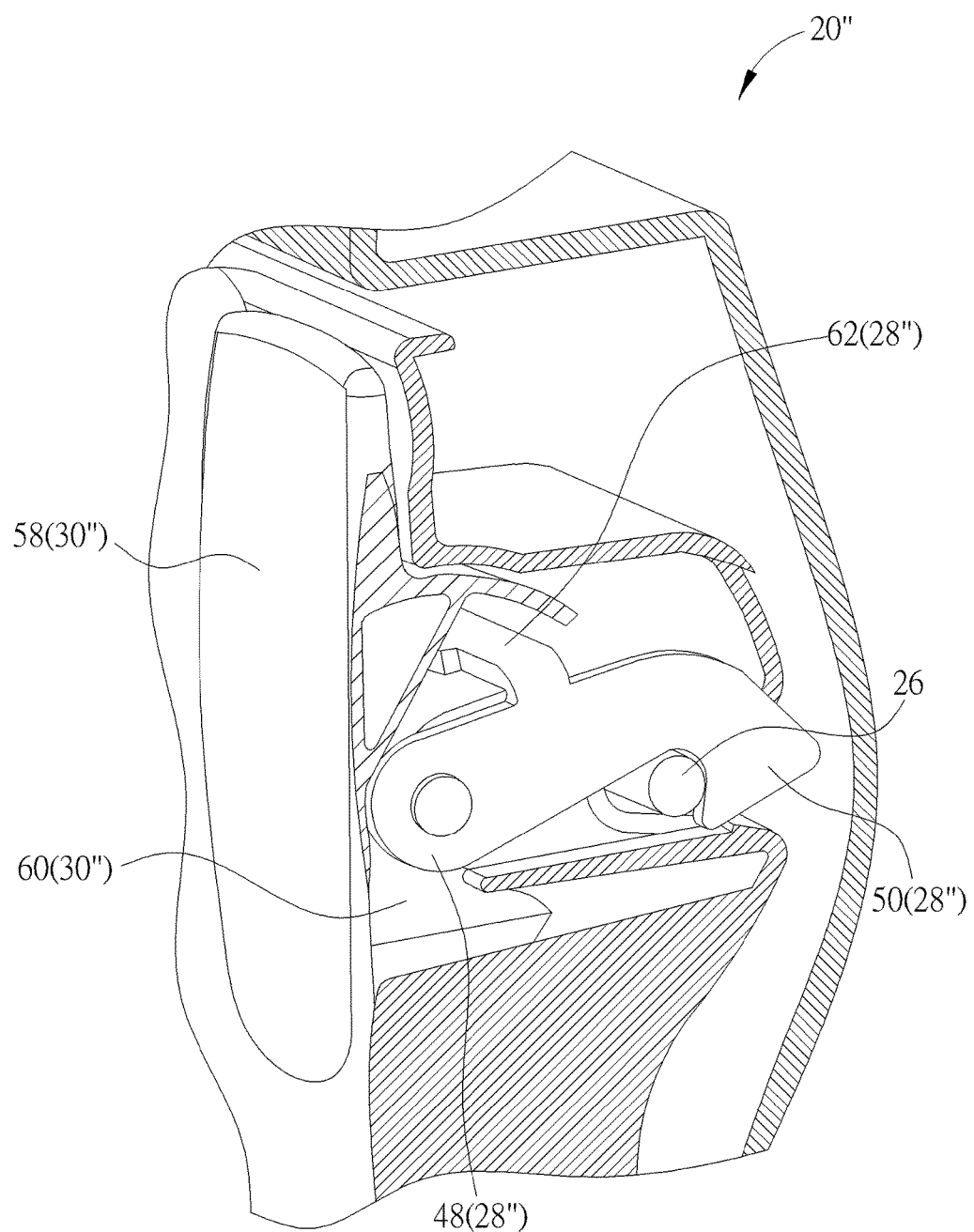
FIG. 13 is a partial diagram of the safety belt assembling device according to the third embodiment of the present invention.

The said safety belt assembling device can be a unit of the child restraint system 14, and utilized to assemble the child restraint system 14 with the vehicle seat. Please refer to FIG. 9 to FIG. 13. FIG. 9 is another diagram of the child restraint system 14 according to the embodiment of the present invention. FIG. 10 is a diagram of the fastener mechanism 20" of the safety belt assembling device 12" according to a third embodiment of the present invention. FIG. 11 and FIG. 12 respectively are exploded diagrams of the fastener mechanism 20" in different views according to the third embodiment of the present invention. FIG. 13 is a partial diagram of the safety belt assembling device 12" according to the third embodiment of the present invention. In the third embodiment, elements having the same numerals as ones of the above-mentioned embodiments have the same structures and functions, and a detailed description is omitted for simplicity.

As shown in FIG. 9, the safety belt 24 can pass through holes 80 formed on the child restraint system 14 and be located between the panel 18 and the child restraint 16. The panel 18 can be rotated relative to the child restraint 16 to press a part of the safety belt 24 into the sunken structure 22, the safety belt 24 can be fixed on the child restraint system 14 by the safety belt assembling device 12", and accordingly the child restraint system 14 can be stably assembled with the vehicle seat (not shown in the figures).

The releasing actuator 30" of the fastener mechanism 20" can include a handle portion 58 and a contacting portion 60 connected to each other. The handle portion 58 has a pull end 581 and a push end 582 opposite to each other, and a middle of the handle portion 58 is rotatably disposed on the panel 18. The contacting portion 60 can abut against the pivot portion 48 of the latching hook 28" to drive motion of the latching hook 28". The latching hook 28" of the fastener mechanism 20" can further include a bridge portion 62 located between the pivot portion 48 and the hook portion 50. A resilient component 64 can be optionally disposed between the releasing actuator 30" and the panel 18 for recovery of the releasing actuator 30".

As shown in FIG. 11 and FIG. 13, the push end 582 of the handle portion 58 can be pressed into the concave structure 46 for a start, so as to move the pull end 581 exposed out of the concave structure 46 for easy manipulation. Then, the pull end 581 can be pulled outward further, such as being rotated in a counterclockwise direction, the contacting portion 60 can be lifted to abut against the pivot portion 48 for rotation, and the hook portion 50 can be disengaged from the locking rod 26; therefore it can be seen that the latching hook 28" is synchronously rotated with rotation of the releasing actuator 30" via the contacting portion 60. While the releasing actuator 30" is moved from the protruding position to the flush position, the releasing actuator 30" can press the bridge portion 62 to rotate the latching hook 28" in a clockwise direction, so as to engage the latching hook 28" with the locking rod 26.

Figure 14:
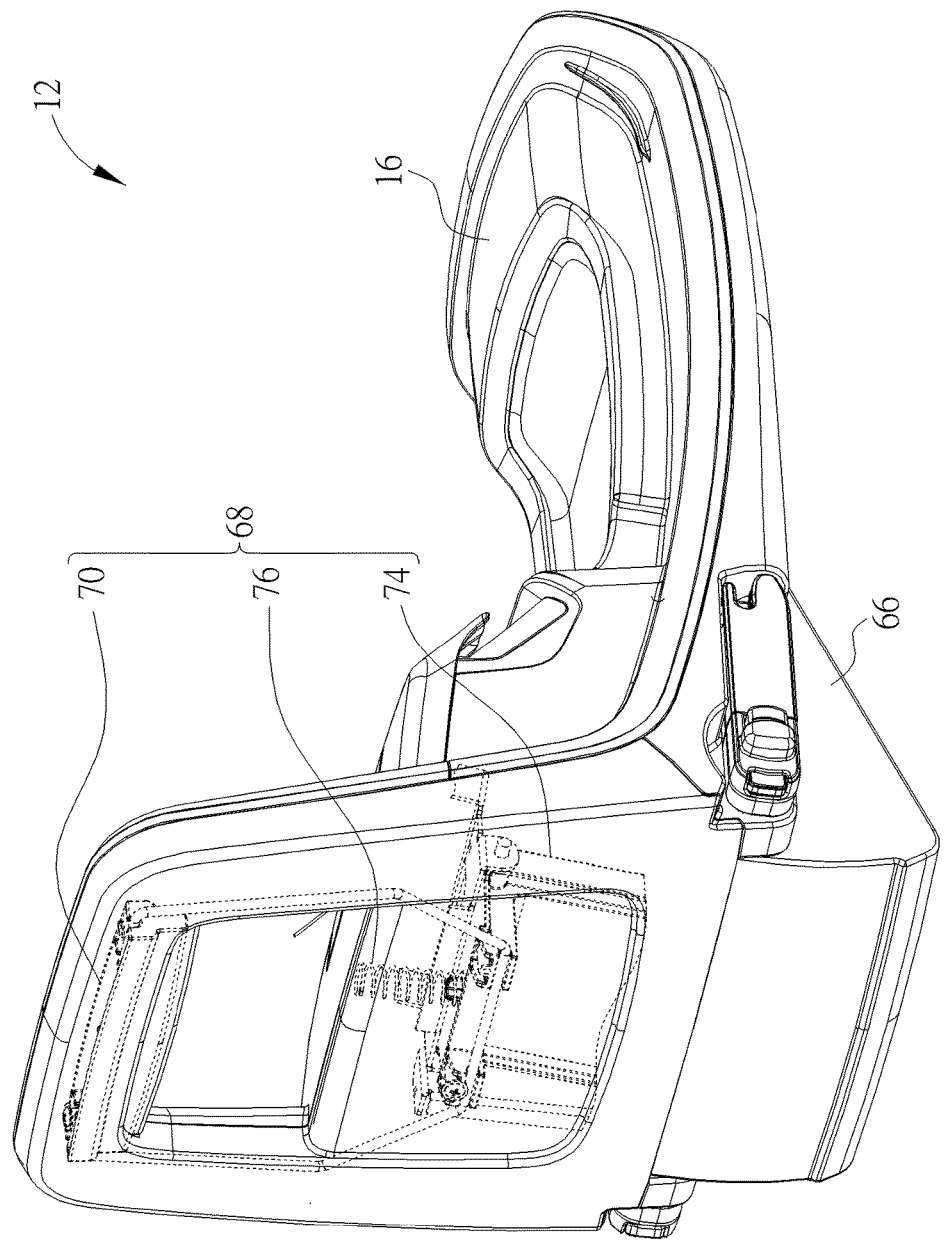
FIG. 14 is another view of the safety belt assembling device shown in FIG. 2.
Figure 15:
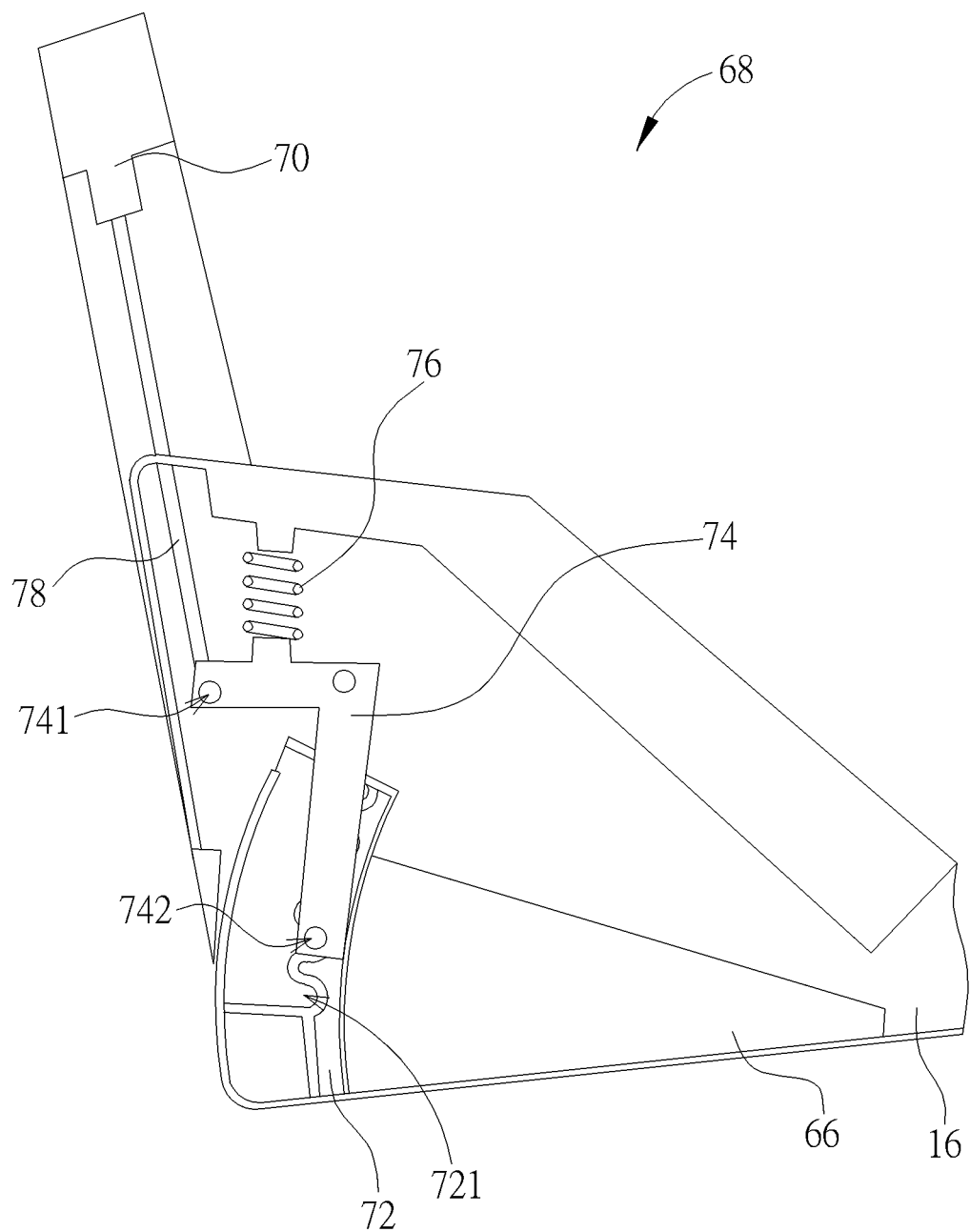
FIG. 15 and FIG. 16 respectively are diagrams of the safety belt assembling device in different reclining modes according to the embodiment of the present invention.
Figure 16:
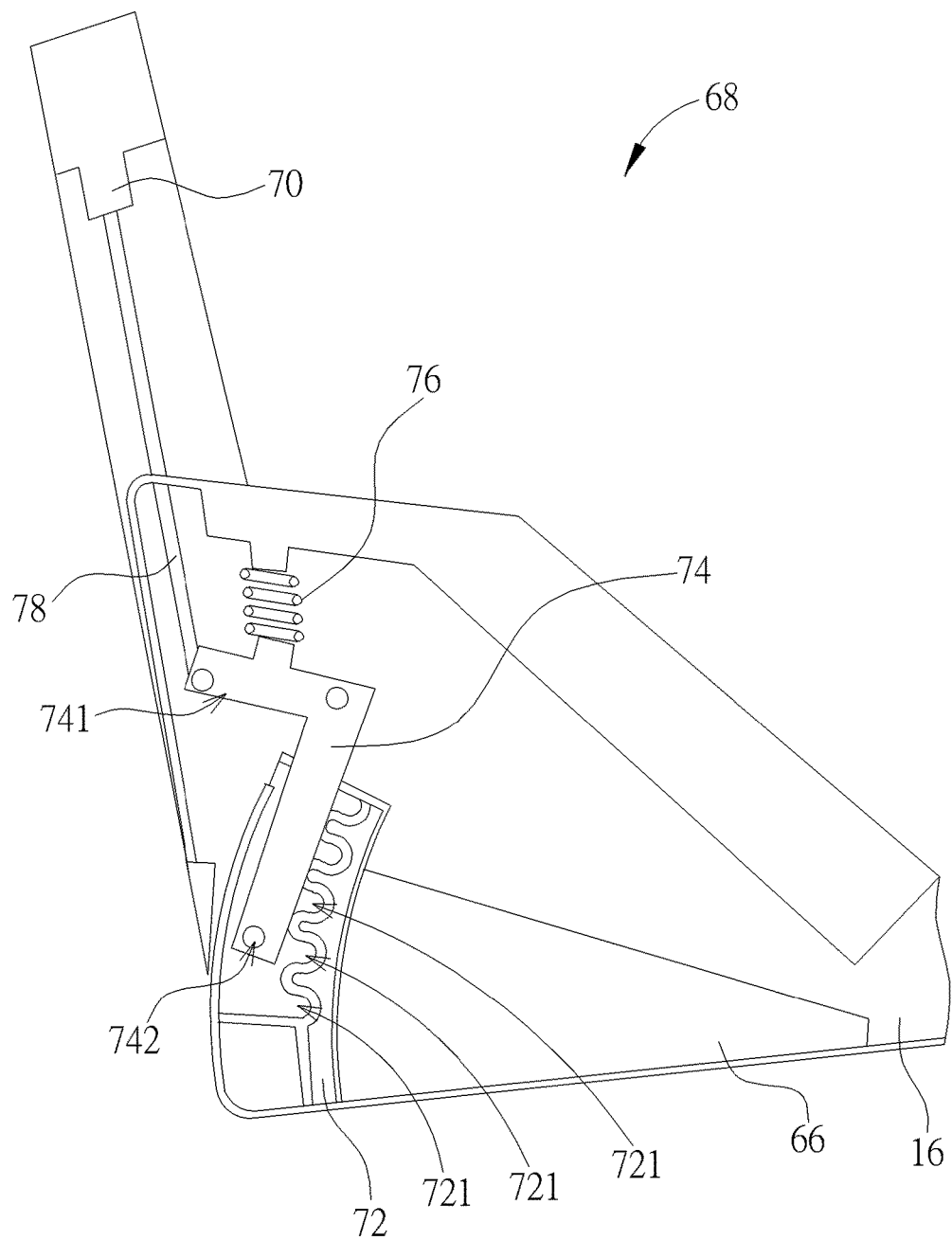

Please refer to FIG. 14, FIG. 15 and FIG. 16. FIG. 14 is another view of the safety belt assembling device 12 shown in FIG. 2. FIG. 15 and FIG. 16 respectively are diagrams of the safety belt assembling device 12 in different reclining modes according to the embodiment of the present invention. The safety belt assembling device 12 may further include a chassis 66 and a reclined adjusting mechanism 68, the chassis 66 can be rotatably disposed under the bottom of the child restraint 16, the reclined adjusting mechanism 68 can be disposed between the child restraint 16 and the chassis 66 and adapted to adjust a lift height of the bottom of the child restraint 16 relative to the chassis 66. The reclined adjusting mechanism 68 can include a handlebar 70, a rack unit 72, a joining component 74 and an elastic component 76. The handlebar 70 is movably disposed inside the child restraint 16. The rack unit 72 is disposed inside the chassis 66 and has a plurality of slot structures 721. The joining component 74 is rotatably disposed on the child restraint 16 and connected between the handlebar 70 and the rack unit 72. The elastic component 76 is disposed between the child restraint 16 and the joining component 74.

As shown in FIG. 15, a first end 741 of the joining component 74 can be connected to the handlebar 70 via a linking member 78, and a second end 742 of the joining component 74 different from the first end 741 can be detachably engaged with one of the plurality of slot structures 721. The handlebar 70 can be pulled up to rotate the joining component 74 in the clockwise direction via the linking member 78, the second end 742 of the joining component 74 can be disengaged from the rack unit 72, and the chassis 66 can be rotated relative to the child restraint 16 for lifting and lowering adjustment. As shown in FIG. 16, while the external force applied to the handlebar 70 is removed, a recovering force of the elastic component 76 can press the first end 741 to rotate the joining component 74 in the counterclockwise direction, so the second end 742 can be engaged with one of the slot structures 721 for providing multiple angular positions.

In conclusion, the safety belt assembling device can be disposed on the vehicle seat by the safety belt, and the child restraint system can be detachably assembled with the safety belt assembling device to stand on the vehicle seat. Further, the safety belt assembling device can be integrated with the back of the child restraint, a safety belt of the vehicle seat passes through the hole on the child restraint system and is fastened by the safety belt assembling device, so as to stably constrain the child restraint system on the vehicle seat. The safety belt assembling device utilizes a panel to press the safety belt with a child restraint, the safety belt is sunk into a sunken structure of the child restraint, and engagement of the panel and the sunken structure is fixed by a fastener mechanism, so that the safety belt assembling device and the related child restraint can be fastened on the vehicle seat. The fastener mechanism utilizes a latching hook and a locking rod to prevent the panel from being rotated relative to the child restraint, and further utilizes a releasing actuator to manually control motion of the latching hook. The latching hook optionally has two-stage operation and automatic recovering function, and minimal effort is required to conveniently install the child restraint system each time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A safety belt assembling device capable of assembling a child restraint system with a vehicle seat, the safety belt assembling device comprising:
    a child restraint connected with the child restraint system, the child restraint having a sunken structure;
    a panel rotatably disposed on the child restraint and adapted to press a safety belt of the vehicle seat inside the sunken structure; and
    a fastener mechanism, comprising:
        a locking rod disposed inside the sunken structure;
        at least one latching hook rotatably disposed on the panel and utilized to detachably catch on the locking rod; and
        a releasing actuator rotatably disposed on the panel and connected with the latching hook, the releasing actuator being rotated from a flush position to a protruding position to disengage the latching hook from the locking rod.

2. The safety belt assembling device of claim 1, wherein the fastener mechanism further comprises a first recovering component disposed between the latching hook and the panel, and utilized to engage the latching hook with the locking rod.

3. The safety belt assembling device of claim 1, wherein the fastener mechanism further comprises a second recovering component disposed between the releasing actuator and the panel, and utilized to press the releasing actuator from the protruding position to the flush position.

4. The safety belt assembling device of claim 1, wherein the latching hook comprises:
    a pivot portion pivotally connected with the panel;
    a first contact portion connected with the pivot portion; and
    a hook portion connected with the pivot portion and opposite to the first contact portion, the hook portion being engaged with and disengaged from the locking rod in accordance with motion of the first contact portion.

5. The safety belt assembling device of claim 4, wherein the releasing actuator comprises a handle portion and a second contact portion connected with each other, the second contact portion contacts against the first contact portion, and motion of the first contact portion and the second contact portion are actuated by pull of the handle portion.

6. The safety belt assembling device of claim 5, wherein the panel comprises a concave structure whereinside the latching hook and the releasing actuator are disposed, and the handle portion align with an edge of the concave structure while the releasing actuator is located at the flush position.

7. The safety belt assembling device of claim 6, wherein a dimension of the concave structure is greater than a dimension of the handle portion.

8. The safety belt assembling device of claim 1, wherein the fastener mechanism further comprises a resilient component disposed between the latching hook and the panel.

9. The safety belt assembling device of claim 8, wherein the resilient component moves the latching hook to engage with the locking rod and simultaneously drives rotation of the releasing actuator.

10. The safety belt assembling device of claim 1, wherein the latching hook comprises:
   a pivot portion pivotally connected with the panel; and
   a hook portion connected with the pivot portion and engaged with the locking rod in a detachable manner.

11. The safety belt assembling device of claim 10, wherein the releasing actuator comprises a first handle portion and a second handle portion rotatably connected with each other, and an edge of the first handle portion detachably contacts against the second handle portion.

12. The safety belt assembling device of claim 11, wherein the panel comprises a concave structure whereinside the latching hook and the releasing actuator are disposed, the second handle portion is pushed into the concave structure to move the first handle portion from a first stage to a second stage to be exposed out of the concave structure, and the latching hook is still engaged with the locking rod.

13. The safety belt assembling device of claim 12, wherein the first handle portion and the second handle portion align with edges of the concave structure while the releasing actuator is set at the flush position.

14. The safety belt assembling device of claim 12, wherein when the second handle portion is static, the first handle portion is pulled outward from the second stage to a third stage to contact and disengage the latching hook from the locking rod.

15. The safety belt assembling device of claim 14, wherein the latching hook is synchronously rotated with rotation of the first handle portion while the first handle portion is moved from the second stage to the third stage.

16. The safety belt assembling device of claim 10, wherein the releasing actuator comprises a handle portion with a pull end and a push end opposite to each other, and a middle of the handle portion is rotatably disposed on the panel.

17. The safety belt assembling device of claim 16, wherein the panel comprises a concave structure whereinside the latching hook and the releasing actuator are disposed, the push end is pressed into the concave structure to move the pull end out of the concave structure.

18. The safety belt assembling device of claim 16, wherein the releasing actuator further comprises a contacting portion connected to the handle portion and abutting against the pivot portion, the latching hook is synchronously rotated with rotation of the releasing actuator via the contacting portion.

19. The safety belt assembling device of claim 10, wherein the latching hook further comprises a bridge portion located between the pivot portion and the hook portion, the releasing actuator presses the bridge portion to rotate and engage the latching hook with the locking rod.

* * * * *